United States Patent
Li et al.

(10) Patent No.: US 7,826,469 B1
(45) Date of Patent: Nov. 2, 2010

(54) MEMORY UTILIZATION IN A PRIORITY QUEUING SYSTEM OF A NETWORK DEVICE

(75) Inventors: Xianzhi Li, Santa Clara, CA (US);
Hongsheng Ping, San Jose, CA (US);
Qingming Ma, Santa Clara, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 10 days.

(21) Appl. No.: 12/400,529

(22) Filed: Mar. 9, 2009

(51) Int. Cl.
*H04L 12/28* (2006.01)
(52) U.S. Cl. .......................... 370/412; 370/428; 710/52
(58) Field of Classification Search ................... None
See application file for complete search history.

(56) References Cited

U.S. PATENT DOCUMENTS

| | | | |
|---|---|---|---|
| 6,327,625 B1 * | 12/2001 | Wang et al. | 709/235 |
| 6,920,146 B1 * | 7/2005 | Johnson et al. | 370/415 |
| 7,609,709 B2 * | 10/2009 | Kim et al. | 370/412 |
| 2004/0073703 A1 | 4/2004 | Boucher et al. | |
| 2007/0171928 A1 * | 7/2007 | Kim et al. | 370/412 |
| 2008/0301256 A1 * | 12/2008 | McWilliams et al. | 709/214 |
| 2009/0279559 A1 * | 11/2009 | Wong et al. | 370/412 |

\* cited by examiner

*Primary Examiner*—Bob A Phunkulh
(74) *Attorney, Agent, or Firm*—Shumaker & Sieffert, P.A.

(57) ABSTRACT

In general, the invention is directed to techniques for improving memory utilization in a priority queuing system of a network device. More specifically, a priority queue memory management system is described in which memory pages are assigned to the various priority queues in order to implement an efficient first in, first out (FIFO) functionality. The dynamic memory techniques described herein allow the multiple priority queues to share a common memory space. As a result, each priority queue does not require a pre-allocated amount of memory that matches the aggregate size of the packets that must be buffered by the queue.

25 Claims, 7 Drawing Sheets

MEMORY UTILIZATION IN A PRIORITY QUEUING SYSTEM OF A NETWORK DEVICE

TECHNICAL FIELD

The invention relates to computer networks and, more particularly, to memory utilization within network devices.

BACKGROUND

In general, a network device sends and receives network packets that have widely varying characteristics and functions. For example, certain packets contain network management control information, while others may carry content for a real-time application, such as streaming video or Voice-over-IP telephony.

Because the amount and types of network traffic being transmitted, analyzed, routed, and filtered by computer networks continues to grow, many networks offer quality of service (QoS) guarantees beyond best-effort service in order to assure a certain level of performance. For example, a network may guarantee a certain maximum delay from a particular source to a particular destination. As another example, a network may promise to provide a guaranteed level of bandwidth to a particular node. These QoS guarantees are often grouped into priority levels, with each priority level providing a different level of service.

The mechanisms required to achieve QoS guarantees are implemented in network devices, such as routers, switches, and firewall devices. Typically, such a device contains a number of priority queues corresponding to the different priority levels. As packets are received by the network device, they are analyzed and classified according to their priority. Each packet is then assigned to one of the many priority queues within the network device, where the packet is then buffered in order to await processing. Conventional priority queues within a typical network device must be deep, requiring a significant amount of memory, in order to accommodate unpredictable bursts of network packets that may be classified as one particular priority. The network device processes the packets in the priority queues according to the requirements specified by the corresponding QoS guarantee in order to achieve the requisite level of service.

SUMMARY

In general, the invention is directed to techniques for improving memory utilization in a priority queuing system of a network device. More specifically, a priority queue memory management system is described in which memory pages are assigned to the various priority queues in order to implement an efficient first in, first out (FIFO) functionality. The dynamic memory techniques described herein allow the multiple priority queues to share a common memory space. As a result, each priority queue does not require a pre-allocated amount of memory that matches the aggregate size of the packets that must be buffered by the queue.

In addition, the memory management system buffers incoming packets before writing the packets to a memory page for their assigned queue. Multiple incoming packets assigned to any particular queue may, for example, be held in a write buffer until the system determines that the buffer contents should be transferred to a memory page in the shared memory space. Packets read from the shared memory space are similarly held in a prefetch buffer for processing by the network device.

In one embodiment, the invention is directed to a method for receiving incoming network packets with a network device, and assigning, with the network device, the network packets to one of a plurality of FIFO priority queues maintained by the network device based on one or more priority characteristics of the network packets. The method further comprises writing the network packets to a write buffer associated with the priority queue, assigning a first one of a plurality of memory pages to the one of the priority queues to which the network packets were assigned, wherein each of the plurality of memory pages comprises a block of contiguous memory address space, and reading the network packets from the write buffer. The method also comprises storing each of the network packets from the write buffer to the first memory page in a FIFO ordering by consecutively writing the network packets, in the order in which the network packets were received, to sequential memory locations in the first memory page, creating a metadata for each of the network packets, wherein the metadata comprises a reference to the memory location in the first memory page of the corresponding network packet, and enqueuing the metadata for each of the network packets on the priority queue.

In another embodiment, the invention is directed to a network device comprising a priority queuing system, wherein the priority queuing system comprises a plurality of FIFO priority queues. The network device also comprises a computer-readable storage medium comprising a plurality of memory pages, wherein each of the plurality of memory pages comprises a block of contiguous memory address space, a packet classification module that receives network packets and assigns the network packets to one of the plurality of priority queues based on one or more priority characteristics of the network packets, and a plurality of write buffers, wherein each of the plurality of write buffers is associated with a respective one of the plurality of priority queues. The network device further comprises a memory management module, wherein the memory management module assigns a first one of the plurality of memory pages to the one of the plurality of priority queues to which the network packets were assigned, wherein the memory management module writes the network packets to the write buffer associated with the priority queue, and wherein the memory management module reads the network packets from the write buffer and stores the network packets from the write buffer to the first memory page in a FIFO ordering by consecutively writing the network packets, in the order in which the network packets were received by the packet classification module, to sequential memory locations in the first memory page.

In another embodiment, the invention is directed to a computer-readable medium comprising instructions. The instructions cause a programmable processor to receive incoming network packets with a network device, and assign the network packets to one of a plurality of FIFO priority queues based on one or more priority characteristics of the network packets. The instructions further cause the programmable processor to write the network packets to a write buffer associated with the priority queue, assign a first one of a plurality of memory pages to the priority queue to which the network packets were assigned, and read the network packets from the write buffer. The instructions also cause the programmable processor to store each of the network packets from the write buffer to the first memory page in a FIFO ordering by consecutively writing the network packets, in the order in which the network packets were received, to sequential memory locations in the first memory page, create a metadata for each of the network packets, wherein the metadata comprises a reference to the memory location in the first memory page of the corresponding network packet, and enqueue the metadata for each of the network packets on the priority queue.

The techniques described herein may present several advantages. For example, the dynamic memory techniques described may reduce the need for multiple, dedicated deep packet queues and, therefore, may foster higher memory utilization, reducing the amount of memory required for device operation. The techniques also allow packets assigned to each priority queue to be stored one after another as in a dedicated queue model. This feature permits bursts of packets to be written to and read from the memory in sequential order by priority (or "back-to-back"), which may increase the memory bandwidth efficiency. Finally, aggregating data transfers using write and prefetch buffers allows the system to transfer memory to and from the shared memory space in larger blocks, which may further increase the memory bandwidth efficiency of the network device.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
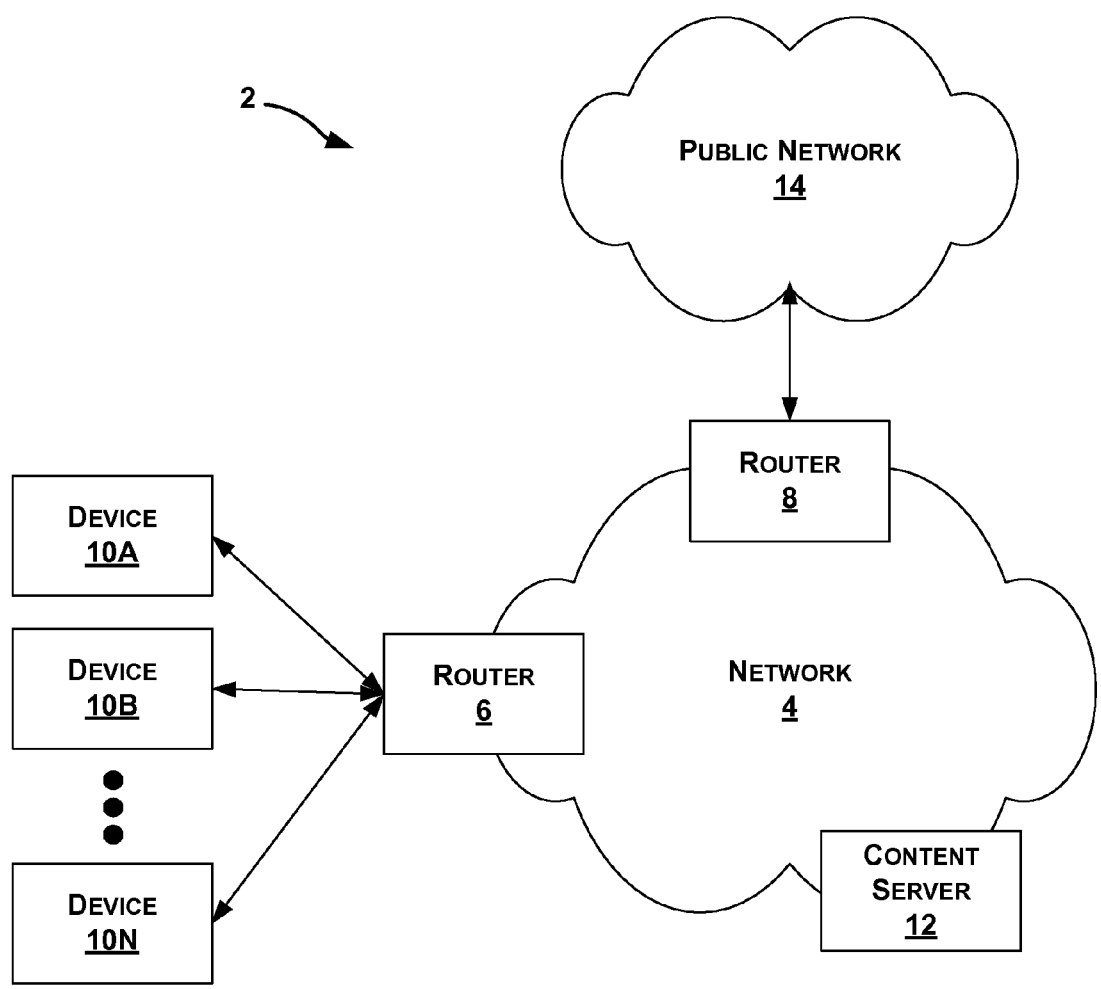
FIG. 1 is a block diagram illustrating an exemplary computer network in which a router receives and transmits network traffic.

FIG. 1 is a block diagram illustrating an exemplary system 2 in which network 4 includes router 6. Devices 10A-10N (collectively, devices 10) connect to network 4 via router 6 in order to access resources provided by network 4. Each of devices 10 may be an end-user computing device, such as a personal computer, a laptop computer, a mobile telephone, a network telephone, a television set-top box, a video game system, a point-of-sale device, a personal digital assistant, an intermediate network device, a network appliance, a supercomputer, a mainframe computer, an industrial robot, or another type of device capable of interfacing with and communicating over network 4.

Network 4 may include a plurality of network devices that facilitates the access of content by devices 10. Each of the plurality of network devices may comprise one of a router, a switch, a server, a database, a hub, a firewall, an intrusion detection/prevention (IDP) device and/or any other type of networking equipment or device that facilitates the transfer of data to and from devices 10. Network 4 includes router 6 and router 8, which communicate using various protocols, such as the Border Gateway Protocol and the Internet Control Message Protocol, in order to exchange routing, network configuration information, and other information. The network may be a local area network ("LAN"), such as a token ring or Ethernet network, a virtual local area network ("VLAN"), or another type of network. The network may comprise one or more wired or wireless links. For example, network 4 may be an Ethernet network that comprises one or more Ethernet cables. In another example, the network may be a Wireless Fidelity ("Wi-Fi") network that uses wireless radio transmissions to communicate information. Although shown as a single network 4 in FIG. 1, network 4 may comprise any number of interconnected networks, either public or private, in which the various networks interconnect to form one or more virtual networks.

Network 4 provides a variety of resources for which devices 10 desires access. In the example of FIG. 1, network 4 includes content server 12 that stores or otherwise sources content, which, as the term is used herein, refers to any data commonly transmitted and/or stored within a network, such as web-based applications, images, documents, web pages, video data, audio data such as voice, web-based games, scripts, or any other type of network-based content. Typically network 4 will also connect to a variety of other types of devices (e.g., file servers, printers, telephones, and e-mail and other application servers). Network 4 is also shown coupled to public network 14 (e.g., the Internet). Public network 14 may include, for example, one or more client computing devices. Public network 14 may provide access to web servers, application servers, public databases, media servers, end-user devices, and many other types of network resource devices and content.

Network 4 may transmit content to devices 10 through router 6 using one or more packet-based protocols, such as an Internet Protocol (IP)/Transmission Control Protocol (TCP). In this respect, network 4 may support the transmission of data via discrete data units, often referred to as "packets." As a result, network 4 may be referred to as a "packet-based" or "packet switched" network. While described in this disclosure as transmitting, conveying, or otherwise supporting packets, network 4 may transmit data according to any other discrete data unit defined by any other protocol, such as a cell defined by the Asynchronous Transfer Mode (ATM) protocol, or a datagram defined by the User Datagram Protocol (UDP).

Network traffic delivered by network 4 may be classified according to a number of categories. For instance, content server 12 may stream live video to one of devices 10 through router 6. Packets that transmit such video may be classified as streaming multimedia packets. Content server 12 may also send web pages to one of devices 10 using HTTP packets. As another example, information exchanged by routers 6 and 8 may be categorized as network management traffic. In addition to being classified by application, network traffic may be classified by source or destination, user, protocol, and port (for TCP and UDP), among others characteristics.

Various categories of network traffic may require a certain level of network performance. For example, streaming multimedia may require guaranteed bandwidth to provide an acceptable user experience. As another example, network management traffic should experience low delays in order to maintain the efficiency of a network. Also, internet service providers (ISPs) may prioritize traffic for certain users over others. To meet these requirements, network 4 includes mechanisms to support quality of service (QoS) guarantees according to a number of predefined QoS levels.

In network 4, aspects of QoS are implemented in router 6, which receives, analyzes, and classifies packets to assign the packets to a suitable priority level. In addition to classifying packets, router 6 processes the received and classified packets according to their priority level. In this manner, router 6 implements aspects of the QoS guarantees provided by network 4.

Router 6 supports the invention described herein in order to improve memory utilization within the router when performing the QoS functions described above. For example, as further described below, router 6 implements a priority queue memory management system for queuing packets received from devices 10 or network 4. When queuing packets, router 6 assigns pages of memory to its internal priority queues in order to implement an efficient first in, first out (FIFO) functionality. The dynamic memory techniques allow the multiple priority queues to share a common memory space within router 6. As a result, each individual priority queue does not require a pre-allocated amount of memory that matches the aggregate size of the packets that must be buffered by the queue.

Although the principles of this invention are described with respect to a router, they are applicable to other network devices that implement a prioritized data processing system. For example, the invention may be applied to an ATM switch, a LAN switch, an interface card, or many other types of devices.

Figure 2:
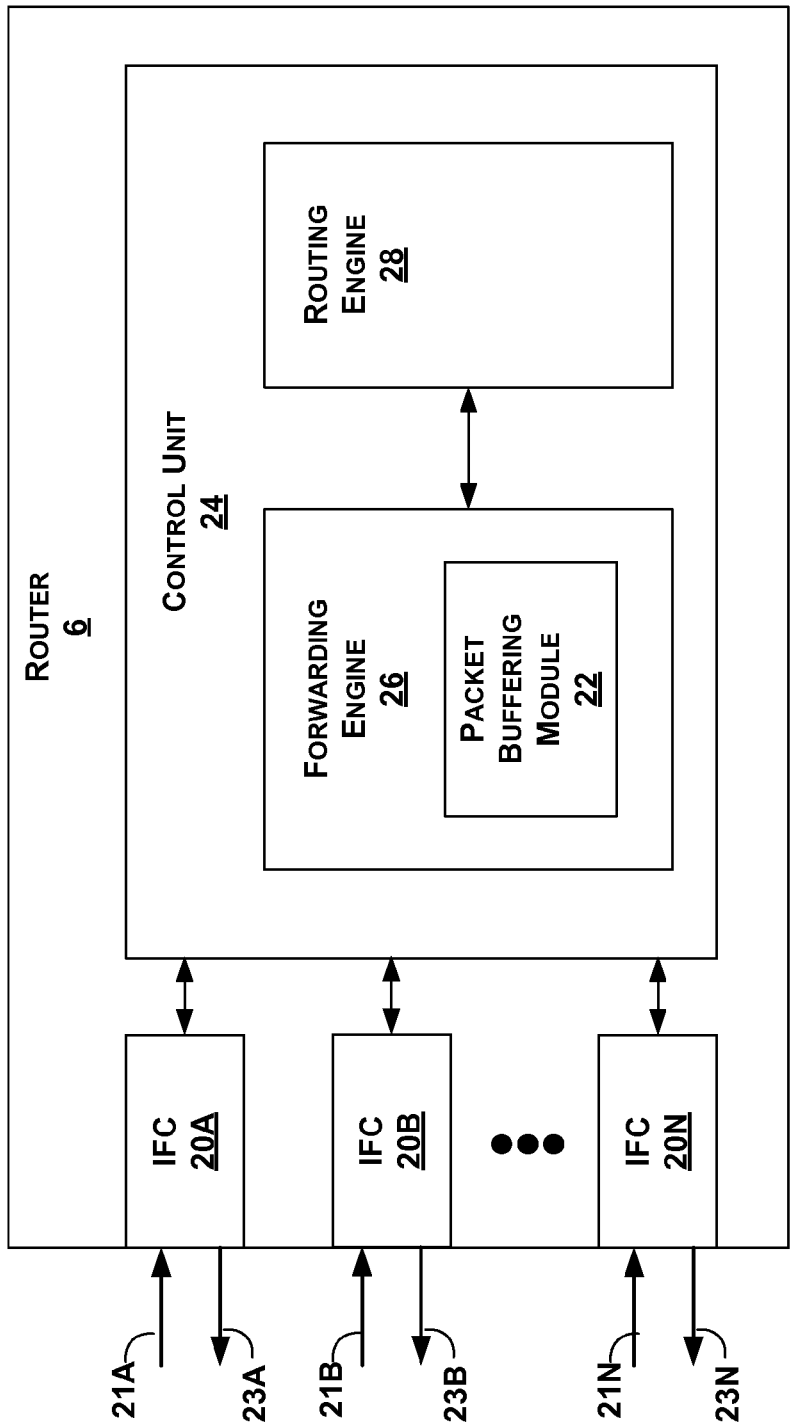
FIG. 2 is a block diagram illustrating an exemplary embodiment of a router consistent with the principles of the invention.

FIG. 2 is a block diagram illustrating, with exemplary details, one embodiment of the router 6 of FIG. 1. Router 6 includes interface cards 20A-20N (collectively, IFCs 20), packet buffering module 22, and control unit 24.

The IFCs 20 receive and send data units, such as packet flows, via network links 21A-21N and 23A-23N, respectively. Router 6 may include a chassis (not shown) having a number of slots for receiving a set of cards, including IFCs 20. Each card may be inserted into a corresponding slot of the chassis for electrically coupling the card to control unit 24. IFCs 20 deliver incoming packets to control unit 24 for processing.

In general, control unit 24 manages the functionality of the router and may comprise one or more of a processor, a programmable processor, a general purpose processor, an integrated circuit, an Application Specific Integrated Circuit (ASIC), a Field Programmable Gate Array (FPGA), or any type of hardware unit capable of implementing the techniques described herein. Control unit 24 may further include computer readable storage media, such as dynamic memory (e.g., Random Access Memory or RAM, dynamic RAM or DRAM, and a cache) and/or static memory (e.g., static RAM or SRAM, a Read Only Memory or ROM, and Flash memory), and storage devices, such as Compact Disc ROMs or CDROMs, hard drives, RAM drives, and Digital Video Disc (DVD) drives. In some instances, the computer-readable storage medium may include instructions that cause a programmable processor to implement the principles of the invention described herein.

Control unit 24 comprises forwarding engine 26 and routing engine 28. Routing engine 28 represents a hardware and/or software module that performs the routing functions of router 6, such as calculating packet routes and executing routing protocols to maintain routing tables. Routing engine 28 provides forwarding information to forwarding engine 26. Forwarding engine 26 represents a hardware and/or software module that performs the forwarding functions of the router, such as packet validation, route lookup, and delivery. In some embodiments, forwarding engine 26 is distributed in whole or in part to the IFCs 20 in order to perform the requisite forwarding functions on incoming packets in parallel.

Forwarding engine 26 includes packet buffering module 22, which comprises a hardware and/or software module that stores packets as they are received by the forwarding engine. As a component of forwarding engine 26, packet buffering module 22 may be distributed in whole or in part to the IFCs 20 in order to perform the functions described below. In the embodiment of FIG. 2, IFCs 20 receives a packet on inbound links 21A-21N (collectively, inbound links 21) and then writes the packet to a shared data bus for the components of router 6. In some embodiments, one of IFCs 20 writes the packet header to the data bus but stores the payload in memory to reduce bus activity.

Packet buffering module 22 reads the packet from the shared data bus and analyzes the packet according to one or more of the priority classification characteristics identified above. That is, the packet buffering module 22 determines, for example, one or more of the packet's application, source, destination, user, protocol, port, and MPLS label or MPLS EXP bit, among other possible classification characteristics. Packet buffering module 22 then applies one or more packet prioritization policies to the determined characteristics to classify the packet to a predefined priority level.

Packets frequently arrive at router 6 in bursts that exceed the capacity of forwarding engine 26 or routing engine 28 to process the packets in real-time. In order to mitigate packet discard and in accordance with the dynamic memory sharing techniques described herein, packet buffering module 22 may buffer incoming packets in a plurality of memory buffers until such time as forwarding engine 26 or routing engine 28 have sufficient capacity to process them. The memory buffers may be logically and/or physically separated by priority level to facilitate QoS.

Typically, when forwarding engine 26 is ready to process a packet, forwarding engine 26 determines the priority level that should be serviced next. Forwarding engine 26 may make this determination based any of a number of scheduling algorithms, but generally the forwarding engine 26 will use some form of weighted fair queuing to foster QoS among the different packet queues. Weighted fair queuing allocates a greater share of the processing capacity of forwarding engine 26 to higher priority levels. Forwarding engine 26 may also consider current characteristics of the memory buffer, such as the relative number of buffered packets for each of the different priority levels, in making a scheduling determination.

In some embodiments, packet buffering module 22 provides scheduling functionality. In addition, in some embodiments, routing engine 28 may direct forwarding engine 26 to service a particular priority level at a particular time.

Upon determining the next priority level to service, forwarding engine 26 directs packet buffering module 22 to read one or more packets having that priority level from memory. The forwarding engine proceeds to perform the forwarding functions on the one or more packets read from the packet buffer. That is, forwarding engine 26 may validate the packets, lookup the appropriate route, apply security services, and/or deliver the packets to the appropriate one of IFCs 20 for transmission on one or more of outbound links 23A-23N (collectively, outbound links 23). Forwarding engine 26 may deliver one or more of the packets to routing engine 28 for additional processing related to routing table maintenance, protocol management, route calculation, and other routing functionality. Packets processed by routing engine 28 may be returned to forwarding engine 26 for additional processing and delivery to one of IFCs 20.

When buffering packets for subsequent processing, packet buffering module 22 implements a priority queue memory management system for queuing packets. When queuing packets, packet buffering module 22 assigns pages of memory to its internal priority queues in order to implement an efficient first in, first out (FIFO) functionality. The dynamic memory techniques allow the multiple priority queues to share a common memory space allocated from memory of control unit 24. As a result, each individual priority queue maintained by packet buffering module 22 does not require a pre-allocated amount of memory that matches the aggregate size of the packets that must be buffered by the queue.

Figure 3:
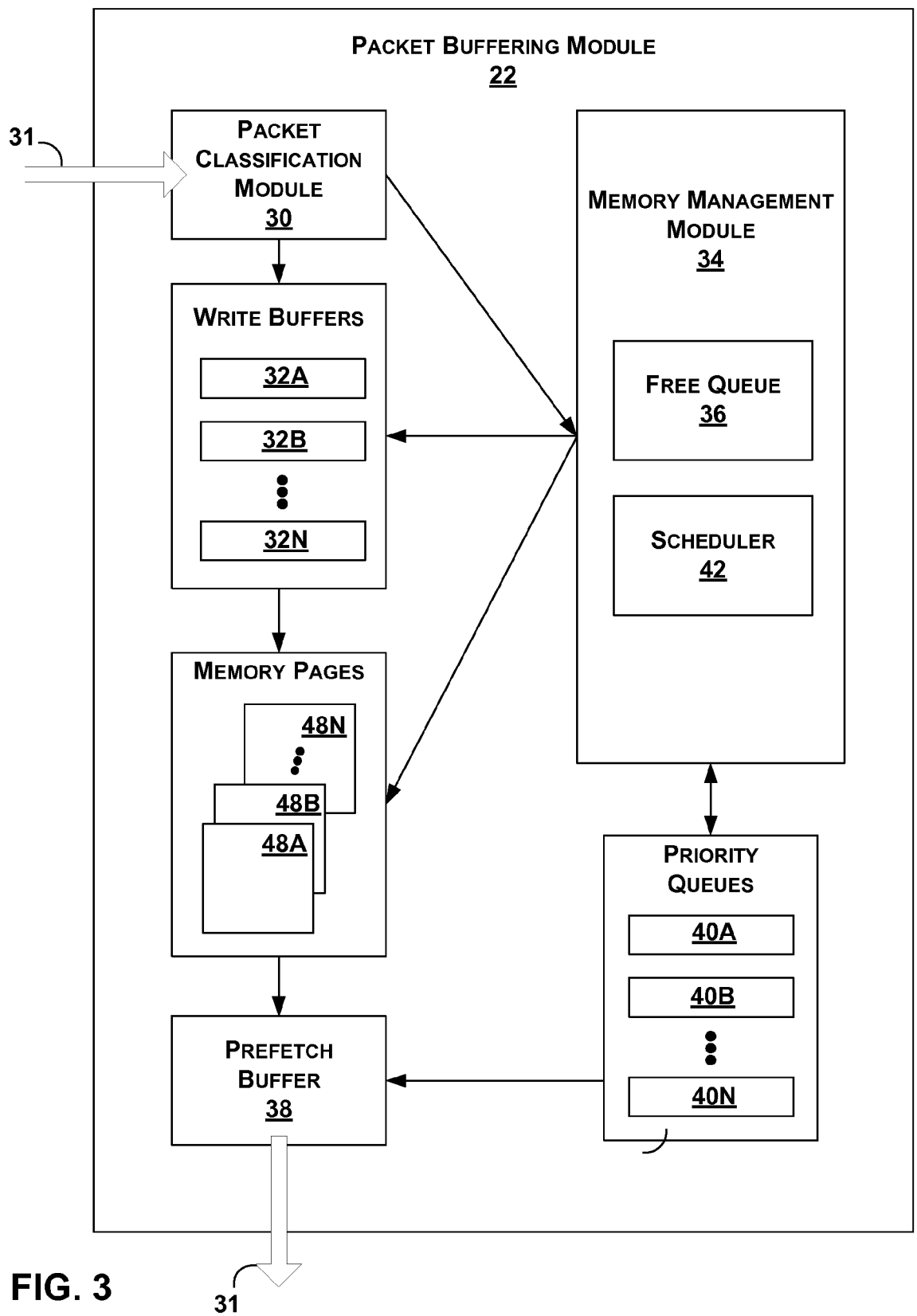
FIG. 3 is a block diagram illustrating, in further detail, a packet buffering module that implements the principles of the invention.

FIG. 3 is a block diagram illustrating in further detail one embodiment of packet buffering module 22. As described above, the packet buffering module 22 comprises hardware and/or software that analyzes and stores packets delivered by IFCs 20 to the forwarding engine 26 according to their priority level. In addition, packet buffering module 22 may schedule one or more packets for the forwarding engine 26 for processing.

Packet buffering module 22 includes packet classification module 30. The packet classification module 30 may be implemented as control logic within hardware, or as software instructions to execute on one or more general- or special-purpose processors. Packet classification module 30 may also include specialized hardware, such as an FPGA or ASIC having high-speed registers, for increased performance. Typically, packet classification module 30 retrieves inbound packet data (e.g., from a network interface) for transfer to write buffers 32. As packets are received from the network, packet classification module 30 determines a QoS classification for each packet and assigns the packet to one of write buffers 32.

In general, packet classification module 30 is an ingress for packet buffering module 22. Packet classification module 30 receives packets, determines one or more characteristics of the received packets, and then classifies the received packets to one or more priority levels, each corresponding to various QoS guarantees, based on the determined characteristics. Typically, packet classification module 30 determines the characteristics of the received packets from the packet headers, such as the IP or TCP header, but packet classification module 30 may also analyze higher level protocol layers, such as the application layer, lower level protocol layers, or even the data payload. The packet classification module 30 may then apply a set of policies (not shown) to the packet characteristics in order to classify each packet to the one or more priority levels.

Packet buffering module 22 further includes memory management module 34, write buffers 32, memory pages 48, and priority queues 40. Priority queues 40A-40N (collectively, priority queues 40) comprise N queues corresponding to the N priority levels established by network 4 and implemented, in part, by router 6. Each of priority queues 40 receives references (e.g., a memory address pointer to a packet stored in memory pages 48) to packets assigned to its corresponding priority level and maintains those references in the order that they were received. As forwarding engine 26 processes packets assigned to a particular level, the priority queue for that level provides the reference to the earliest received packet remaining in the priority queue. In this manner, priority queues 40 implement the characteristic first-in-first-out (FIFO) functionality of a queue structure. Priority queues 40 comprise one or more computer readable storage media, such as dynamic memory (e.g., RAM or DRAM) and/or static memory (e.g., SRAM).

Write buffers 32A-32N (collectively, write buffers 32) are a set of N memory buffers. Each of write buffers 32 is assigned to a corresponding one of priority queues 40. As described in detail below, the write buffers temporarily store classified packets for their respective priority queues until the requirements for transferring the packets to main memory are met. Write buffers 32 generally comprise high-speed memory, such as SRAM. In some embodiments, write buffers 32 may comprise a dynamic shared write buffer that implements a shared memory model. That is, memory may be dynamically allocated among write buffers 32 in order to meet the dynamic memory requirements of the corresponding priority queues 40.

Memory pages 48A-48M (collectively, memory pages 48) are a set of M blocks of main memory that store packets that await processing by forwarding engine 26 and/or routing engine 28. Typically, the pages have equivalent fixed-lengths and each page contains contiguous memory addresses for physical and/or virtual addressing. The number of pages, M, may depend on a variety of design factors, including the overall size of the memory available and the desired page size, which itself may depend on the architecture of a particular embodiment of the invention. For example, a single memory page may comprise one megabyte of memory, but there may be one thousand such memory pages. In this example, therefore, memory pages 48 collectively comprise one gigabyte of memory space. Memory pages 48 comprise one or more computer readable storage media, such as dynamic memory and/or static memory.

In some embodiments, memory pages 48 comprise DDR2 SDRAM ("DDR2"), a type of DRAM. DDR2 includes multiple banks of memory consisting of cells arranged as a matrix and addressable by row and column. To write and read data to/from a DDR2, the DDR2 must activate a row. To read from another row, the DDR2 must deactivate the presently activated row and then activate the new row from which data must be read. This process of activation and deactivation introduces significant overhead into read/write operations for DDR2 memory. DDR2 memory is accessible in bursts of two or four cycles, whereby, after a first data word is written, additional data words may be written consecutively without incurring additional latency. When, however, sufficient consecutive data is not present to fill a burst, a read/write operation using this data will introduce still more overhead. For example, if there are four cycles per burst yet there are five data words to be written, three null words must be used to pad the second cycle. As a result, data cycles should be multiples of the burst size in order to maximize the data throughput to/from a DDR2 memory system.

In these embodiments, each of memory pages 48 may comprise a contiguous block of physical memory that begins at the first column of a row of a DDR2 memory bank and ends at the last column of a row of a DDR2 memory bank. Arranging memory pages at the row boundaries in this manner results in an association of each row with a particular memory page of memory pages 48; this may prevent additional overhead that would otherwise incur if cell locations in a row were distributed in an association with a plurality of memory pages. Typically, the size of a memory page is a multiple of the size of each of write buffers 32 in order to avoid overhead involved in splitting the contents of a write buffer among a plurality of memory pages.

Generally, memory management module 34 directs the flow of data and metadata between packet classification module 30, write buffers 32, memory pages 48, and priority queues 40. In addition, the memory management module 34 may allocate resources among these components. Memory management module 34 may include and maintain data structures containing certain characteristics of write buffers 32, memory pages 48, and priority queues 40. The data structures may describe the present state of these components with regard to, for example, memory capacity, stored packet characteristics, resource allocation, and other properties.

Memory management module 34 further includes free queue 36 ("free queue 36"). The free queue 36 is a data structure that maintains and provides address pointers to any free pages of memory pages 48, that is, pages that are not currently being used by packet buffering module 22 to store packets that await processing. At an initial state of router 6, free queue 36 may contain address pointers to all M pages of memory pages 48 that have been allocated for packet queuing, for memory management module 34 has not yet assigned any of memory pages 48 to priority queues 40. The M pages of memory pages 48 may be enqueued on the free queue 36 in any order.

In the example packet buffering module 22 of FIG. 3, packet classification module 30 receives an incoming packet sent by one of IFCs 20 to packet buffering module 22 and classifies the incoming packet to one or more priority levels corresponding to the N priority queues of priority queues 40. Upon classification, packet classification module 30 sends details relating to the packet and the packet's assigned priority level to memory management module 34. For example, the packet classification module 30 may send the packet's length and assigned priority level.

Upon receiving packet information, memory management module 34 analyzes the current state of the particular buffer of write buffers 32 associated with the assigned priority level of the packet. For example, priority level 0 may correspond to priority queue 40A having associated write buffer 32A. If the packet is assigned priority level 0, the memory management module determines whether there is additional memory space in write buffer 32A to contain at least a portion of the packet data. If the write buffer 32A has additional space, memory management module 34 transfers at least a portion of the packet data from the packet classification module to the write buffer 32A. In some cases, write buffer 32A will have adequate space to buffer the entire packet. In other cases, only a portion of the packet data may be written to the write buffer 32A before the write buffer 32A becomes full. The remainder of the packet may be held by packet classification module 30 until memory management module 34 transfers the contents of write buffer 32A to one of memory pages 48. Once the transfer operation is complete, memory management module 34 transfers the remainder of the packet to the write buffer 32A.

As described above, at an initial state of router 6, pointers to each of memory pages 48 allocated for use by priority queues 40 for storing packet data may be contained in free queue 36. Moreover, each of priority queues 40 is empty, that is, they contain no packet references. In the example embodiment of FIG. 3, packet data is stored in memory pages 48 for eventual processing by forwarding engine 26. Before packet data is transferred from one of write buffers 32 to a memory page, however, memory management module 34 pops a pointer to the memory page from free queue 36 and assigns the pointer to the newly allocated memory page to the priority queue corresponding to the packet's priority level.

Accordingly, before memory management module 34 transfers the contents of filled write buffer 32A to one of memory pages 48, the memory management module pops the reference to a memory page, memory page 48A for example, from free queue 36 and assigns memory page 48A to priority queue 40A. Memory page 48A, so long as this assignment remains in effect, will only store packets assigned to the priority level corresponding to priority queue 40A.

In this way, once memory management module 34 assigns memory page 48A to priority queue 40A, the memory space associated with memory page 48A is temporarily reserved for storing packets assigned priority level 0 (corresponding to priority queue 40A). The memory management module may now transfer the contents of write buffer 32A to working memory page 48A. As additional packets are received and packet classification module 30 assigns them priority level 0, memory page 48A may itself become filled with packet data as a result of subsequent data transfers from the write buffer 32A. When this occurs, memory management module 34 pops an additional memory page, memory page 48B for example, from free queue 36 and assigns memory page 48B to priority queue 40A to provide additional storage capacity for packets having priority level 0.

In some embodiments, memory management module 34 assigns a new, free memory page from free queue 36 to the priority queue before the working memory page 48A becomes filled. For example, in some cases, the remaining space in memory page 48A may be insufficient to store both the present contents of write buffer 32A as well as the entirety of the most recently received packet. Rather than dividing the current packet among a plurality of memory pages that are likely to be noncontiguous, memory management module 34 may instead transfer the present contents of write buffer 32A to the working memory page 48A prior to writing the packet to the write buffer. Memory management module 34 then pops a pointer to an additional memory page from free queue 36 and assigns the additional memory page to priority queue 40A. The memory management module 34 may then transfer the most recently received packet to write buffer 32A.

As part of the packet data transfer operation from write buffer 32A to memory page 48A, memory management module 34 retains address pointers to the location in memory page 48A at which each packet is written; the memory management module 34 may also retain the packet length for each packet written. Because write buffer 32A may contain data for multiple packets or portions thereof, the memory management module 34 may retain multiple address pointers and packet lengths. In some embodiments, the pointers and lengths may be stored as a single structure for each packet. Memory management module 34 pushes this metadata, for each packet, to priority queue 40A as the packet is written to memory page 48A. As a result, priority queue 40A in operation maintains references to stored packets having priority level 0 in the order in which they were received by packet buffering module 22.

The operations described above with regard to exemplary priority level 0, write buffer 32A, priority queue 40A, and memory pages 48A-48B apply in a generalized manner to the other priority levels, 1-N. That is, each priority level has a corresponding one of priority queues 40 itself having an associated one of write buffers 32. For each of priority queues 40, as the contents of successively filled write buffers 32 are transferred to a memory page 48 assigned to the priority queue, memory management module 34 may assign an additional memory page 48 to the priority queue in order to reserve additional memory space.

This shared memory model for the packet storage space (i.e., memory pages 48) of packet buffering module 22, wherein any of memory pages 48 may be assigned to any of priority queues 40, may provide certain advantages. For example, the memory pages are allocated only when they are required in order store packets assigned to a particular priority queue. As a result, a system that implements the shared memory model described herein may avoid pre-allocating a number of large, deep priority queues in order to accommodate unpredictable influxes of packets for the various priority levels. Such a system may require less overall memory and thus fewer memory chips, which reduces cost and power consumption. Even where the network traffic load for the various priorities is highly unbalanced, the techniques described permit dynamic allocation of packet storage space commensurate with the relative load on each priority. For instance, router 6 may experience a spike in the number of received media packets during a popular event that is broadcast on the Internet. Memory management module 34 may manage the spike by allocating a sufficient number of memory pages 48 to the one of priority queues 40 associated with the priority level of the media packets. In this manner, the memory management module 34 may be able to enqueue many more of the packets for processing in such a circumstance than would a conventional system, which would rapidly experience a priority queue overflow.

In addition, although packet buffering module 22 may not employ priority queues each having a pre-allocated, contiguous memory space, packet buffering module 22 may nevertheless store received packets having a particular priority level in sequential order ("back-to-back") in most cases. That is, each packet is stored at a memory location adjacent to the packet previously received and having the same priority level. Each of memory pages 48 may be large in relation to an individual packet, having a size many times that of the maximum size for a typical packet received by router 6. As packets for a particular priority level are transferred from packet classification module 30 to one of write buffers 32 and then to one of memory pages 48, memory management module 34 maintains the packets in the order in which they were received. That is, all packets are maintained as a single FIFO within each memory page. References to the packet are also maintained in the order in which they are pushed onto one of priority queues 40, which corresponds to the order in which the referenced packets were received.

Memory management module 34 further comprises scheduler 42, and packet buffering module 22 further comprises prefetch buffer 38. The memory management module 34 transfers packets from memory pages 48 to the prefetch buffer 38, where they are read by forwarding engine 26 for processing. Scheduler 42 dequeues packet metadata from priority queues 40 to provide memory references for memory management module 34.

In some embodiments, scheduler 42 determines which of priority queues 40 should be serviced next. The scheduler 42 may use one or more scheduling algorithms that foster QoS, such as fair queuing, weighted fair queuing, weighted round robin, and the like, to make the determination. In addition to typical scheduling factors such as queue priority and current load, scheduler 42 may also consider whether the aggregate size of packets currently queued in a particular priority queue is sufficient to fill prefetch buffer 38. In some embodiments, forwarding engine 26 or routing engine 28 determines the priority level that should be serviced next and directs scheduler 42 to dequeue the appropriate one of priority queues 40.

Prefetch buffer 38 is a memory buffer that temporarily stores packets, read from memory pages 48, for forwarding engine 26. Prefetch buffer 38 comprises one or more computer readable storage media, such as dynamic memory (e.g., RAM or DRAM), static memory (e.g., SRAM), or high-speed registers within an FPGA or ASIC. Although described with respect to a single prefetch buffer 38, the prefetch buffer may comprise a plurality of buffers.

Rather than dequeuing one packet for every read operation from memory pages 48, scheduler 42 generally dequeues, from the one of priority queues 40 that is to be serviced, metadata for the number of packets that will maximize the use of memory space in prefetch buffer 38. That is, the aggregate size of the packets to be read that scheduler 42 dequeues will typically fill the prefetch buffer to the extent possible, given the diverse sizes of packets in the queue. In some embodiments, scheduler 42 uses the packet length property of the metadata during the dequeuing process.

In the embodiment of FIG. 3, after scheduler 42 dequeues packet metadata from the serviced one of priority queues 40, memory management module 34 uses the metadata, which includes the addresses for packets in memory pages 48, to transfer packets from one of memory pages 48 to the prefetch buffer. Because scheduler 42 only services one priority queue at a time, the data for the dequeued packets are generally located in a single memory page. Moreover, because memory management module 34 both enqueues and stores packets in the order in which they were received by packet buffering module 22, the data for the dequeued packets generally occupies a contiguous memory space. Upon transferring the data for the dequeued packets to prefetch buffer 38, memory management module 34 notifies forwarding engine 26, which reads the packets from the prefetch buffer and processes them.

In some embodiments, memory management module 34 performs multiple successive buffer fills using packets from a single one of priority queues 40 in order to further increase the utilization of prefetch buffer 38 memory space. Scheduler 42 dequeues successive metadata for packets from one of priority queues 40. Because the size of prefetch buffer 38 may be static, scheduler 42 eventually dequeues metadata for a packet having a size that will overrun the prefetch buffer if transferred from one of memory pages 48 in its entirety. Memory management module 34 may transfer packet data for the previously dequeued packets as well as the portion of the overrun packet sufficient to completely fill prefetch buffer 38. Once forwarding engine 26 reads the prefetch buffer, memory management module 34 may transfer the remainder of the overrun packet to the prefetch buffer together with additional scheduled packets.

Once memory management module 34 transfers all packets stored by a particular one of memory pages 48 to prefetch buffer 38, that memory page is empty and may be freed from the one of priority queues 40 to which the memory page is assigned. Memory management module 34 enqueues newly freed memory page on free queue 36 for future use. The memory management module 34 may determine whether a memory page is empty based on dequeued metadata, in particular the address pointers, from the one of priority queues 40 to which the memory page is assigned.

In some embodiments, the components of packet buffering module 32 share a common computer readable storage media. In other embodiments, the components may be distributed, in a variety of combinations, among a plurality of storage media, which may comprise different types of storage media. For example, memory pages 48, priority queues 40, and memory management module 34 may share a common DDR2 memory space, while write buffers 32 and prefetch buffer 38 comprise SRAM. In some embodiments, priority queues 40 are implemented using a specialized fast FIFO comprising an ASIC or other high-speed logic.

The packet buffering techniques of packet buffering module 22, wherein write buffers 32 may temporarily store multiple packets to allow memory management module 34 to write the packets to one of memory pages 48 in large, contiguous blocks, and wherein scheduler 42 may prepare multiple packets to allow the memory management module to transfer the packets from one of memory pages 48 to prefetch buffer 38 in large contiguous blocks, may provide certain advantages.

For example, in some embodiments, the packet buffering techniques may provide higher memory throughput. As described above, DDR2 memory is accessible in bursts of two or four cycles in order to decrease the average latency per data word. The packet buffering techniques described herein may increase the probability that, for any particular read/write operation involving the DDR2 memory, there are sufficient data amounts to fill the burst size, increasing memory bandwidth. Furthermore, using the packet buffering and dynamic memory sharing techniques together ensures that packets are written to and read from memory in sequential order by priority. Multiple packets may thus be stored on a single DDR2 row, permitting memory management module 34 to consecutively write read a burst of multiple packets while incurring only the overhead necessary to write to and read from a single row, rather than writing and reading successive packets scattered throughout the memory space and opening and closing multiple rows as a consequence. This property further increases memory bandwidth utilization.

Figure 4:
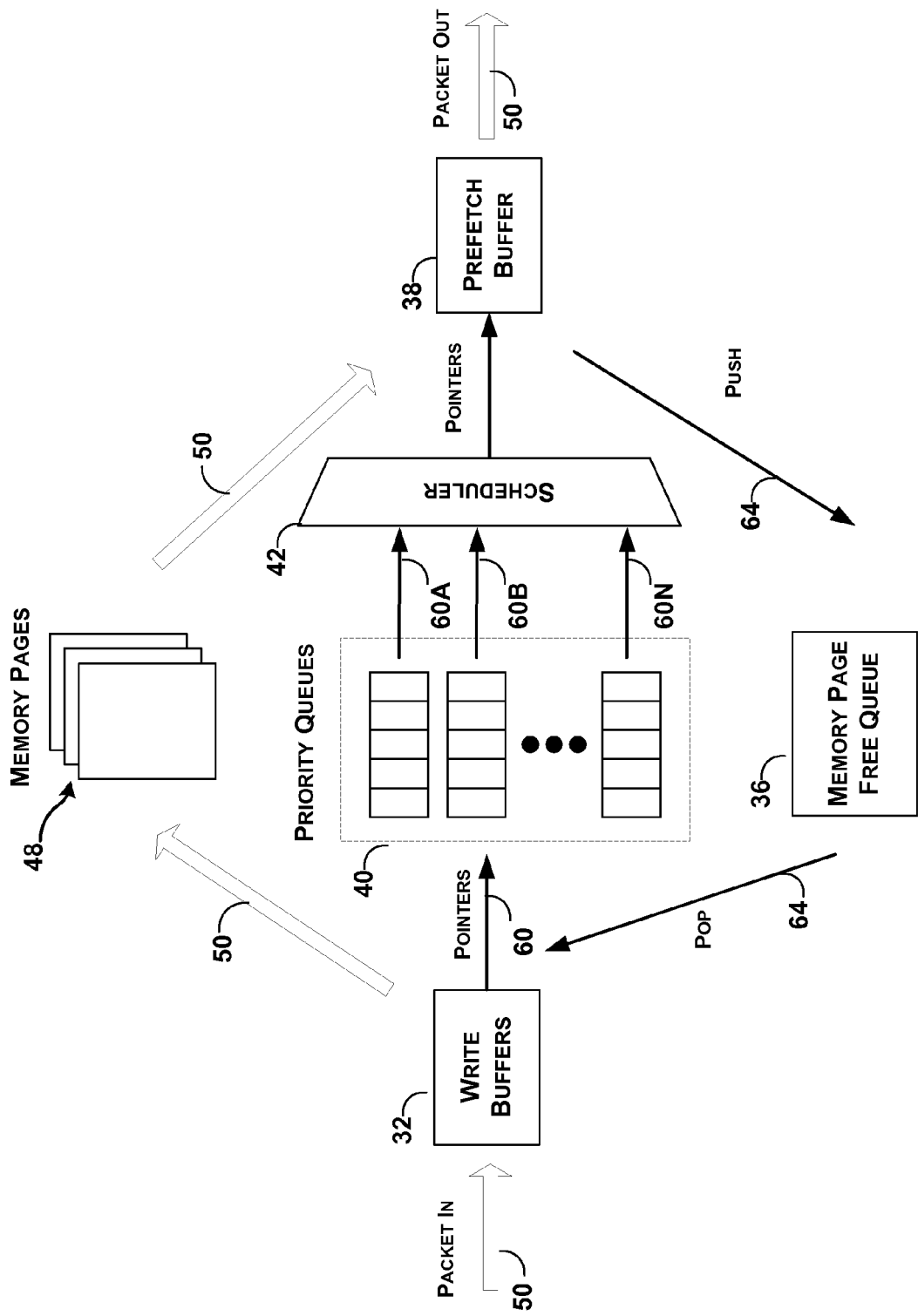
FIG. 4 is a conceptual model illustrating the data and control data flows between components in a manner consistent with the principles of the invention.

FIG. 4 is a conceptual diagram illustrating the movement of packets and packet references through a dynamic memory priority queuing system that implements the principles of the invention. In general, as packets are received from a communication medium (e.g., a network interface or high-speed switch fabric) data for the packets 50 are written to write buffers 32, then to the memory pages 48, and finally to prefetch buffer 38, where the multiple packets may be read by a higher-level component of a system that deploys the priority queuing system. In one embodiment, write buffers 32 and pre-fetch buffer 38 are implemented as high-speed, on-chip memory within one or more packet forwarding integrated circuits, and memory pages are provided by off-chip DDR2 coupled to the packet forwarding integrated circuits by a data bus. Metadata 60 including memory address references to packets are enqueued onto priority queues 40 in the order in which the packets were received. A scheduler 42 dequeues metadata 60A-60N from one of the priority queues in order to obtain references for packets having aggregate data sufficient to fill, to the extent possible, the prefetch buffer. Scheduler 42 may be implemented as software executing on a control processor or as microcode or other control logic within the packet forwarding integrated circuits. Finally, pointers 64 to free memory pages are pushed onto memory page free queue 36 until they are again required by the system, at which time the pointers are popped in preparation for packet data storage.

Figure 5:
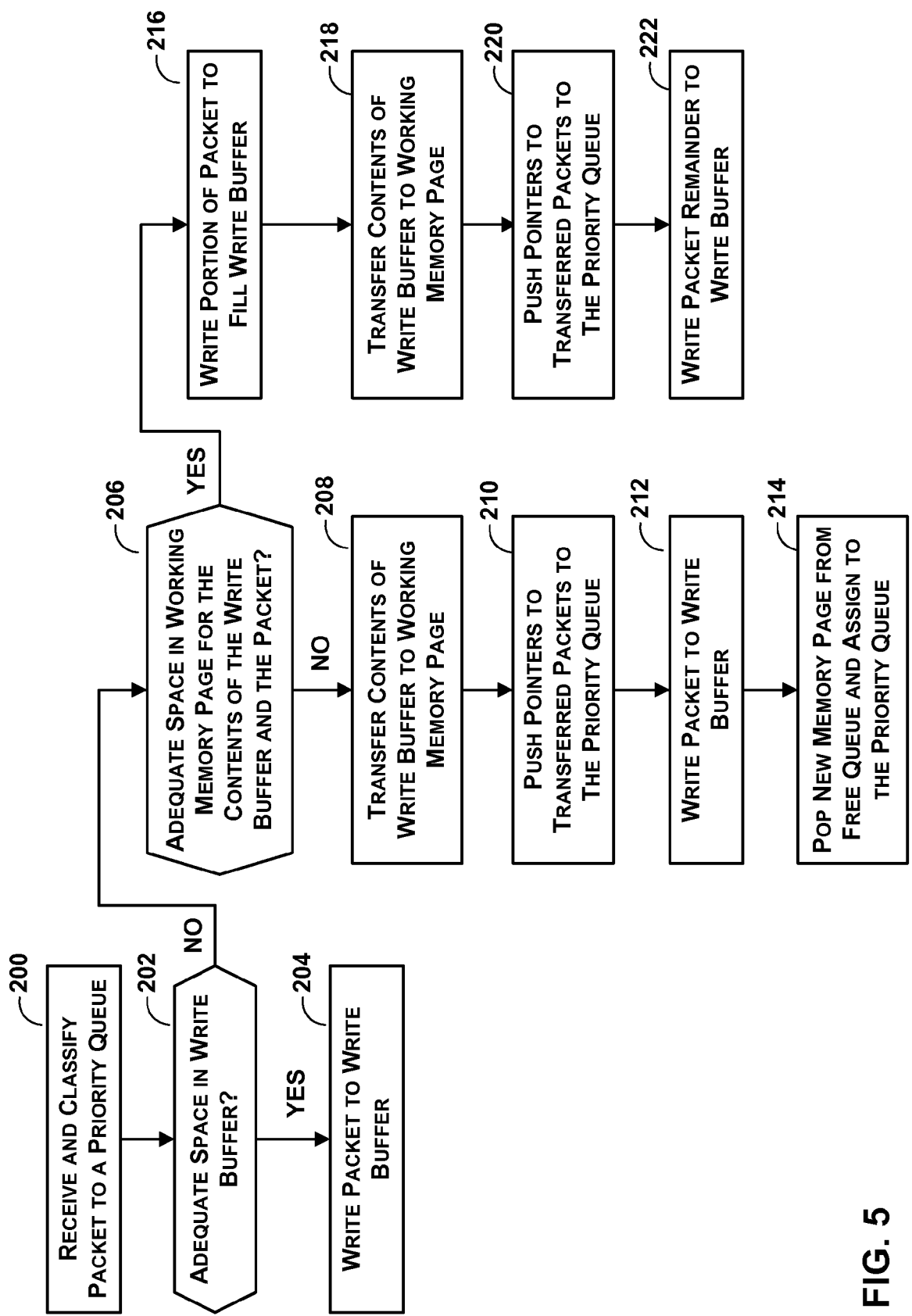
FIG. 5 is a flowchart illustrating an example mode of operation for dynamic memory sharing among priority queues in accordance with the techniques described herein.

FIG. 5 is a flow chart illustrating an example mode of operation, for the exemplary packet buffering module 22 of FIG. 3, for enqueuing a packet within a dynamic memory priority queuing system.

Initially, packet classification module 30 receives, analyzes, and classifies a packet to a priority level based on the packet characteristics (200). Memory management module 34 determines whether there is sufficient memory available in the corresponding write buffer associated with the classified priority level to accommodate the received packet (202). If so, the memory management module 34 transfers the packet data from the packet classification module 30 to the corresponding write buffer, e.g., write buffer 32A, and retains a reference to the packet (204). The packet remains in write buffer 32A until the write buffer is sufficiently filled to trigger the memory management module to transfer of the packet data to a memory page and enqueue references of the transferred packets. If, on the other hand, the packet is too large for the write buffer (NO branch of 202), memory management module 34 then determines whether the working one of memory pages 48, assigned to the relevant priority queue, e.g., priority queue 40A, has sufficient memory available to accommodate the present contents of the write buffer and the packet (206). If the memory page is sufficiently filled (NO branch of 206), memory management module 34 must allocate resources to accommodate the new packet.

First, the memory management module 34 transfers the packets currently held by the write buffer to the working memory page (208). Upon transfer, the memory addresses of the packets in the working memory page is known, and memory management module 34 pushes metadata, including a memory address pointer, for each of the transferred packets onto priority queue 40A (210). The memory management module 34 transfers the received packet from the packet classification module to the newly empty write buffer as well (212). Finally, memory management module 34 pops a reference to one of memory pages 48 from free queue 36 and assigns the new memory page to priority queue 40A (214). Priority queue 40A now has sufficient memory space allocated to accommodate the received packet. As additional packets are received and fill write buffer 32A, memory management module 34 will eventually write the original received packet to the working memory page and enqueue a reference to the packet onto priority queue 40A.

If, upon packet classification, there is not adequate space in write buffer 32A for the packet, but there is adequate space in the working memory page for both the contents of the write buffer and the packet, then memory management module 34 completely fills write buffer 32A with a first portion of the packet (216). The memory management module next transfers the contents of the filled write buffer to the working memory page (218). Upon transfer, memory management module 34 pushes metadata, including a memory address pointer, for each of the transferred packets onto priority queue 40A (220). Finally, memory management module 34 writes the remainder of the packet, left over from the earlier filling of write buffer 32A, to the write buffer 32A (222). When the memory management module 34 again transfers the contents of the filled buffer after receiving additional packets, the packet remainder will be contiguous, in the working memory page, with its initial portion written earlier.

Figure 6:
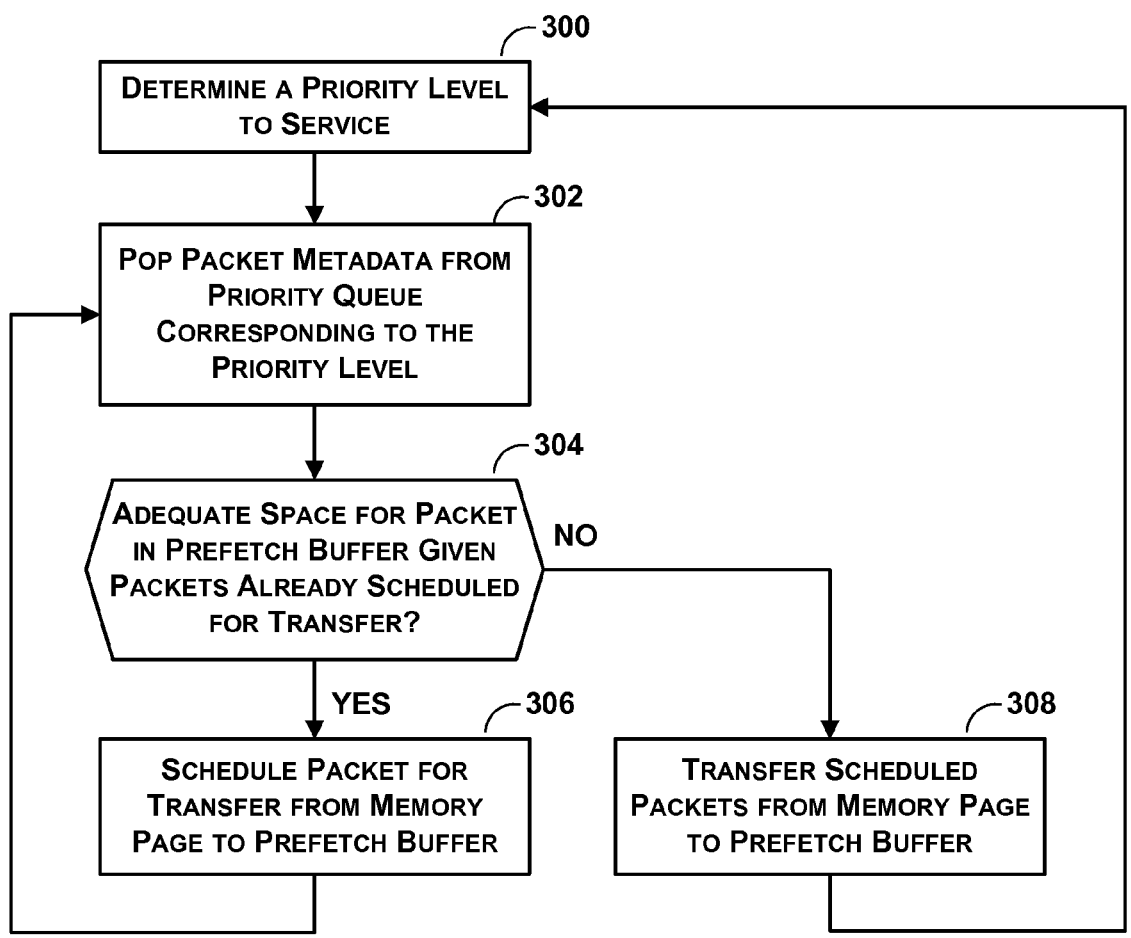
FIG. 6 is a flow chart illustrating an example mode of operation for reading packets from priority queues using a prefetch buffer in accordance with the techniques described herein.

FIG. 6 is a flowchart illustrating an example mode of operation, for the exemplary packet buffering module 22 of FIG. 3, for reading packets from memory pages 48. Scheduler 42 determines a priority level to service based on a scheduling algorithm (300). Next, memory management module 34 pops packet metadata from the one of priority queues 40 that corresponds to the selected priority level (302). Using properties of the metadata, the memory management module determines whether there is adequate space in prefetch buffer 38 to accommodate for all of the presently scheduled packet data and data for the newly popped packet (304). If so, the scheduler adds the newly popped packet to the list of packets to be transferred during the next transfer operation (306). If not, memory management module 34 determines the addresses, in memory pages 48, for the packets in the list of packets to be transferred, reads those packets from one or more of memory pages 48, and writes them to the prefetch buffer (308).

Figure 7:
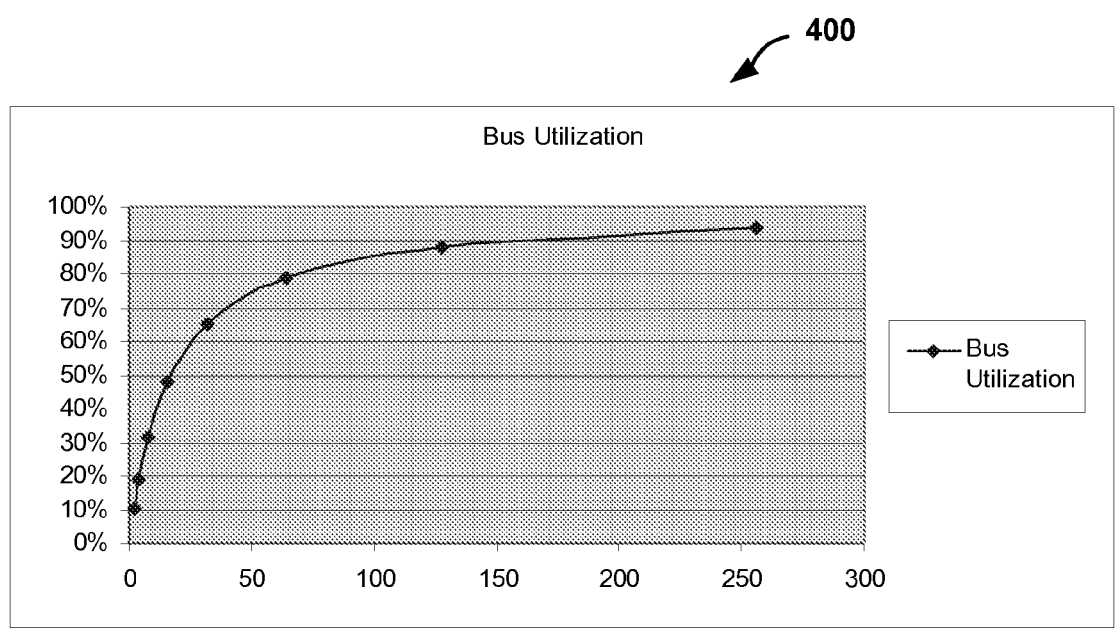
FIG. 7 is a chart displaying the bus utilization of the packet buffering module of FIG. 3.

FIG. 7 is a chart displaying the bus utilization of an exemplary packet buffering module 22 that comprises DDR2 memory such as Micron MT47H32M16BN-3 from Micron Technology, Inc., Boise, Id. In a worst case data operation, every read and write to the DDR2 memory requires row close and row open operations, which constitute overhead. The worst case bus utilization is, therefore, proportional to N/(N+ row overhead), where N is the size of the read or write data cycle. Chart 400 displays the bus utilization (y-axis) according to a varying N (x-axis). For example, where N=64, bus utilization is approximately 79% in the exemplary packet buffer module 22. While a larger value for N provides greater bus utilization, it also requires larger write buffers 32 and a larger prefetch buffer 38.

Various embodiments of the invention have been described. These and other embodiments are within the scope of the following claims.

The invention claimed is:

1. A method comprising:
   receiving incoming network packets with a network device;
   assigning, with the network device, the network packets to one of a plurality of FIFO priority queues maintained by the network device based on one or more priority characteristics of the network packets;
   writing the network packets to a write buffer associated with the priority queue;
   assigning a first one of a plurality of memory pages to the one of the priority queues to which the network packets were assigned, wherein each of the plurality of memory pages comprises a block of contiguous memory address space;
   reading the network packets from the write buffer;
   storing each of the network packets from the write buffer to the first memory page in a FIFO ordering by consecutively writing the network packets, in the order in which the network packets were received, to sequential memory locations in the first memory page;
   creating a metadata for each of the network packets, wherein the metadata comprises a reference to the memory location in the first memory page of the corresponding network packet; and
   enqueuing the metadata for each of the network packets on the priority queue.

2. The method of claim 1, wherein enqueuing the metadata comprises enqueuing the metadata for each of the network packet on the priority queue in the order in which the corresponding network packets were received.

3. The method of claim 1,
   wherein each of the plurality of priority queues is associated with a respective one of a plurality of quality of service priority levels, and
   wherein the network packets are assigned based on the quality of service priority level for the priority queue.

4. The method of claim 1, wherein the first memory page comprises a block of physical address space of a shared computer-readable storage medium.

5. The method of claim 4,
   wherein the computer-readable storage medium comprises a memory bank addressable by rows and columns, and
   wherein the block of physical address space begins at the first column of a first row of the bank and ends at the last column of a second row of the bank.

6. The method of claim 1, wherein writing the network packets to a write buffer comprises writing the network packets, in the order in which the network packets were received, to sequential memory locations in the write buffer.

7. The method of claim 1, further comprising:
   receiving a subsequent incoming network packet with the network device;
   assigning, with the network device, the subsequent network packet to the priority queue; and
   determining whether the write buffer has adequate memory to accommodate the subsequent network packet.

8. The method of claim 7, further comprising writing the subsequent packet to the associated write buffer when the write buffer has adequate memory.

9. The method of claim 8, further comprising:
   reading the subsequent network packet from the write buffer; and
   storing the subsequent network packet from the write buffer to the first memory page in a FIFO ordering with the network packets by writing the subsequent network packet to a memory location in the first memory page that is adjacent to a memory location at which the network packets are written.

10. The method of claim 7, wherein reading the network packets from the write buffer comprises reading the network packets from write buffer when the write buffer does not have adequate memory.

11. The method of claim 10, further comprising:
    determining whether the first memory page has adequate memory for the network packets and for the subsequent network packet.

12. The method of claim 11, further comprising:
    assigning a second one of the plurality of memory pages to the priority queue when the first memory page does not have adequate memory; and
    writing the subsequent network packet to the second memory page.

13. The method of claim 12, further comprising:
    writing a portion of the subsequent network packet to the first memory page at a memory location that is adjacent to a memory location at which the network packets are written when the first memory page has adequate memory; and
    writing a remainder of the subsequent network packet to the associated write buffer.

14. The method of claim 1, further comprising:
    scheduling the network packets and a subsequent network packet to be read from the first memory page;
    reading the network packets and the subsequent network packet from the first memory page;
    writing the network packets and the subsequent network packet to a prefetch buffer;
    determining whether additional packets are stored in the first memory page; and
    freeing the first memory page from the priority queue when no additional packets are stored in the first memory page.

15. The method of claim 14, wherein scheduling the network packets to be read from the first memory page comprises:
    dequeuing metadata for the network packets from the priority queue; and
    determining the memory addresses for each of the network packets from the corresponding metadata for each of the network packets.

16. A network device comprising a priority queuing system, wherein the priority queuing system comprises:
    a plurality of FIFO priority queues;
    a non-transitory computer-readable storage medium comprising a plurality of memory pages, wherein each of the plurality of memory pages comprises a block of contiguous memory address space;
    a packet classification module that receives network packets and assigns the network packets to one of the plurality of priority queues based on one or more priority characteristics of the network packets;

a plurality of write buffers, wherein each of the plurality of write buffers is associated with a respective one of the plurality of priority queues; and a memory management module, wherein the memory management module assigns a first one of the plurality of memory pages to the one of the plurality of priority queues to which the network packets were assigned, wherein the memory management module writes the network packets to the write buffer associated with the priority queue, and wherein the memory management module reads the network packets from the write buffer and stores the network packets from the write buffer to the first memory page in a FIFO ordering by consecutively writing the network packets, in the order in which the network packets were received by the packet classification module, to sequential memory locations in the first memory page.

17. The network device of claim 16, wherein the memory management module generates a metadata for each of the network packets and enqueues the metadata for each network packet on the priority queue in the order in which the corresponding network packets were received by the packet classification module.

18. The network device of claim 16,
wherein each of the plurality of priority queues is associated with a respective one of a plurality of quality of service priority levels, and
wherein the packet classification module assigns the network packets based on the quality of service priority level for the priority queue.

19. The network device of claim 16,
wherein the packet classification module receives a subsequent one or more network packets and assigns the subsequent network packets to the priority queue based on one or more priority characteristics of the subsequent network packets, and
wherein the memory management module assigns a second one of the plurality of memory pages to the priority queue and stores the subsequent network packets to the second memory page in a FIFO ordering by consecutively writing the network packets, in the order in which the network packets were received by the packet classification module, to sequential memory locations in the second memory page.

20. The network device of claim 16,
wherein the memory management module comprises a free queue that contains a reference for each of the memory pages that are not assigned to one of the priority queues.

21. The network device of claim 16,
wherein the non-transitory computer-readable storage medium comprises a bank that comprises the first memory page and is addressable by rows and columns, and wherein the memory management module stores each of the network packets from the write buffer to the first memory page by writing the network packets to a single row of the bank.

22. The network device of claim 17, further comprising:
a prefetch buffer;
wherein the metadata for each network packet comprises a reference to the memory location of the network packet in the first memory page,
wherein the memory management module comprises a scheduler that dequeues the metadata for each network packet,
wherein the memory management module, based on the reference in the metadata for each network packet, consecutively reads the network packets from the first memory page, and
wherein the memory management module writes the network packets to the prefetch buffer.

23. A non-transitory computer-readable medium comprising instructions for causing a programmable processor to:
receive incoming network packets with a network device;
assign, with the network device, the network packets to one of a plurality of FIFO priority queues based on one or more priority characteristics of the network packets;
write the network packets to a write buffer associated with the priority queue;
assign a first one of a plurality of memory pages to the priority queue to which the network packets were assigned;
read the network packets from the write buffer;
store each of the network packets from the write buffer to the first memory page in a FIFO ordering by consecutively writing the network packets, in the order in which the network packets were received, to sequential memory locations in the first memory page;
create a metadata for each of the network packets, wherein the metadata comprises a reference to the memory location in the first memory page of the corresponding network packet; and
enqueue the metadata for each of the network packets on the priority queue.

24. The non-transitory computer-readable medium of claim 23, wherein the instructions further cause the programmable processor to:
dequeue the metadata for each of the network packets from the priority queue;
consecutively read the network packets from the first memory page based on the reference, in the metadata, to the memory location of the corresponding network packet;
write the network packets to a prefetch buffer; and free the first memory page from the priority queue.

25. The non-transitory computer-readable medium of claim 23, wherein the instructions further cause the programmable processor to:
receive a subsequent network packet; and
assign a second one of the plurality of memory pages to the priority queue and store the subsequent network packet to the second memory page.

* * * * *